United States Patent [19]

Trassare, Jr. et al.

[11] Patent Number: 5,132,156

[45] Date of Patent: Jul. 21, 1992

[54] VOID FILLER

[75] Inventors: Anthony Trassare, Jr., Lodi; George C. Boyse, Rocklin; Oliver L. Gee, Jr., Orangevale, all of Calif.

[73] Assignee: Down River International, Inc., San Francisco, Calif.

[21] Appl. No.: 490,126

[22] Filed: Mar. 7, 1990

[51] Int. Cl.$^5$ .............................................. B32B 3/12
[52] U.S. Cl. .................................... 428/116; 428/124; 428/126; 428/181; 52/69; 52/70; 410/153; 410/154; 410/155; 410/156; 206/593; 206/814
[58] Field of Search ............... 428/116, 124, 126, 181, 428/55, 77; 52/64, 69, 70; 40/610, 612; 135/90; 410/153, 154, 155, 156, 121; 206/593, 814, 521; 116/63 P

[56] References Cited

U.S. PATENT DOCUMENTS

| | | | |
|---|---|---|---|
| 337,544 | 3/1886 | Yaggy | 40/120 |
| 2,196,470 | 4/1940 | Montgomery | 440/154 X |
| 2,419,346 | 4/1947 | Ellis | 410/153 |
| 2,950,038 | 8/1960 | Rupp | 206/521 |
| 3,464,367 | 9/1969 | Latter | 410/155 |
| 3,690,620 | 9/1972 | Matson | 248/459 |
| 3,850,112 | 11/1974 | Jaski | 410/154 |
| 3,861,538 | 1/1975 | Locke | 410/155 |
| 4,085,762 | 4/1978 | O'Brian | 40/610 |
| 4,194,313 | 3/1980 | Downing | 40/610 |
| 4,247,237 | 1/1981 | Brown | 410/154 |
| 4,363,579 | 12/1982 | Rogers | 410/154 |
| 4,386,881 | 6/1983 | Liebel | 410/154 |
| 4,494,897 | 1/1985 | Rogers | 206/593 |
| 4,583,338 | 4/1986 | Sewell | 428/116 |
| 4,796,369 | 1/1989 | Hamann | 40/610 |
| 4,865,889 | 9/1989 | Boyse | 428/12 |
| 4,928,415 | 5/1990 | Walters | 40/610 |

*Primary Examiner*—Ellis P. Robinson
*Assistant Examiner*—Nasser Ahmad
*Attorney, Agent, or Firm*—Townsend and Townsend

[57] ABSTRACT

A void filler (14, 16) especially suited for filling large volumes is made from first and second panels (18, 20), each panel having a core (26) sandwiched between face sheets (22, 24). The core is typically a corrugated honeycomb core so that the panel is stiff, strong and yet lightweight. The panels each have generally horizontal upper and lower edges (30, 32) and generally vertical first and second (34, 36) edges. The panels are connected at a hinge (44) along their upper edges. A limiter (50), attached at or near the lower edges, limits the movement of the lower edges away from one another so the panels can move from a flat, storage condition to a use condition, exhibiting a generally inverted V-shape. Two void fillers can be hingedly connected to form an M-shaped void filler assembly (2). The void fillers are typically used between a container bulkhead (10) and a load (8); the upper and lower edges of the void filler are aligned between the load and the bulkhead so the forces on the void filler are exerted on the generally vertical edges during transit.

22 Claims, 3 Drawing Sheets

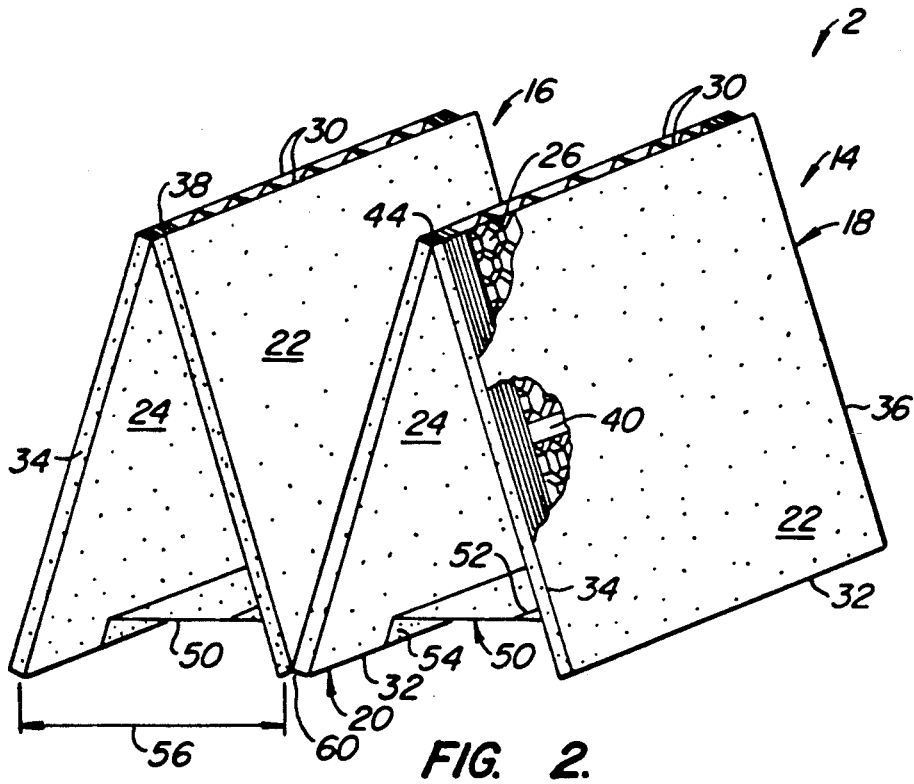
FIG. 2.
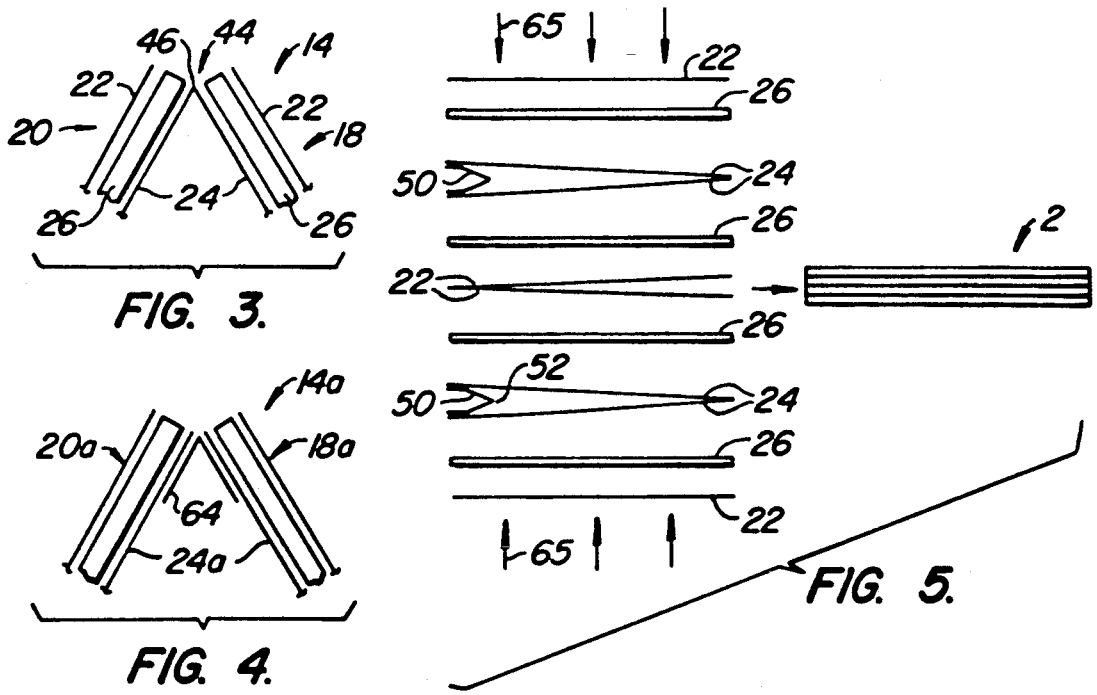
FIG. 3.
FIG. 4.
FIG. 5.

VOID FILLER

BACKGROUND OF THE INVENTION

Transportation of the products often occurs using conventional rectangular shipping containers, such as those transported by trucks, rail cars and ships. Often the interior of the vehicle is not entirely filled. To prevent the load from shifting during transport, various products and procedures have been developed. One type of product used to fill these spaces is a lightweight product called a void filler. See, for example U.S. Pat. Nos. 3,464,367 Latter and 4,865,889 Boyse.

Although the prior art void fillers work well, they are not particularly adapted for filling large volumes. Filling large volumes is especially important when using oversized trailers, especially with dense products which meet the weight limits of the vehicle before meeting the volume limits. Failure to properly position the load within the trailer can result in illegal axle weights as well as poor trailering abilities.

SUMMARY OF THE INVENTION

The present invention is directed to a void filler especially suited for filling large volumes. The void filler is made from first and second panels, each panel having a core sandwiched between face sheets. The core is typically a corrugated honeycomb core so that the panel is stiff, strong and yet lightweight. The panels each have generally horizontal upper and lower edges and generally vertical first and second edges. The panels are hinged together near or at their upper edges. A limiter, typically attached to the panels at or near the lower edges of the panels, limits the movement of the lower edges away from one another to a chosen maximum distance. The panels can thus move from a generally flat storage condition, with the panels lying next to one another, to a use condition, with the panels defining a generally inverted V-shape in the use condition.

Two void fillers can be used to form a void filler assembly in which the lower edge of the second panel of one void filler is hinged to the lower edge of the first panel of the other void filler to create a generally M-shaped void filler assembly.

The void fillers are typically used between a container bulkhead and a load. The upper and lower edges of the void filler are aligned between the load and the bulkhead to prevent shifting of the load during transit. The force of the load is then exerted on and resisted by the generally vertical first and second edges.

A primary feature of the present invention is the recognition that panels having a core sandwiched between face sheets could provide sufficient edge-on rigidity and crushing strength to be used as a void filler. Typically, cellular core void fillers have been used with the load directed against the surfaces of the face sheets, not against the edges. The present invention recognizes that the cellular core panels can provide sufficient edge-on strength with a minimal amount of restraint against buckling. In the preferred embodiment this restraint is achieved through the use of the hinge at or near the upper edges and the limiter at or near the lower edges. Also, the required rigidity is aided through the use of the core and two face sheets bonded, or otherwise secured, to the core.

The generally vertical first and second edges are preferably reinforced since they contact the load and the opposite supporting surface, such as a bulkhead or another load.

The crushing strength of the panel can be augmented using horizontally positioned bracing. The bracing typically consists of one or more horizontally positioned wood boards formed as part of the core. The number, size and spacing of the bracing depends upon the particular load requirements.

The hinged connections between the panels can be made in a number of different ways. For example, the inner face sheets of a void filler can be from a continuous sheet folded at the center to create the hinge. A separate hinge element could be secured to the inner face sheets of the panels along the upper edges as well.

Other features and advantages of the invention will appear from the following description in which the preferred embodiments have been set forth in detail in conjunction with the accompanying drawings.

BRIEF DESCRIPTION OF THE DRAWINGS

FIG. 2 is an enlarged view of the void filler assembly of FIG. 1 with portions of the outer face sheet of one of the panels broken away to show interior details;

FIG. 3 is a simplified exploded end view showing the construction of the hinge used with the void fillers of FIG. 2;

FIG. 4 is a view similar to FIG. 3 but illustrating an alternative hinge arrangement; and FIG. 5 is a schematic illustration of the manufacturing steps taken to assemble the void filler assembly of FIG. 1.

DETAILED DESCRIPTION OF THE PREFERRED EMBODIMENTS

Figure 1:
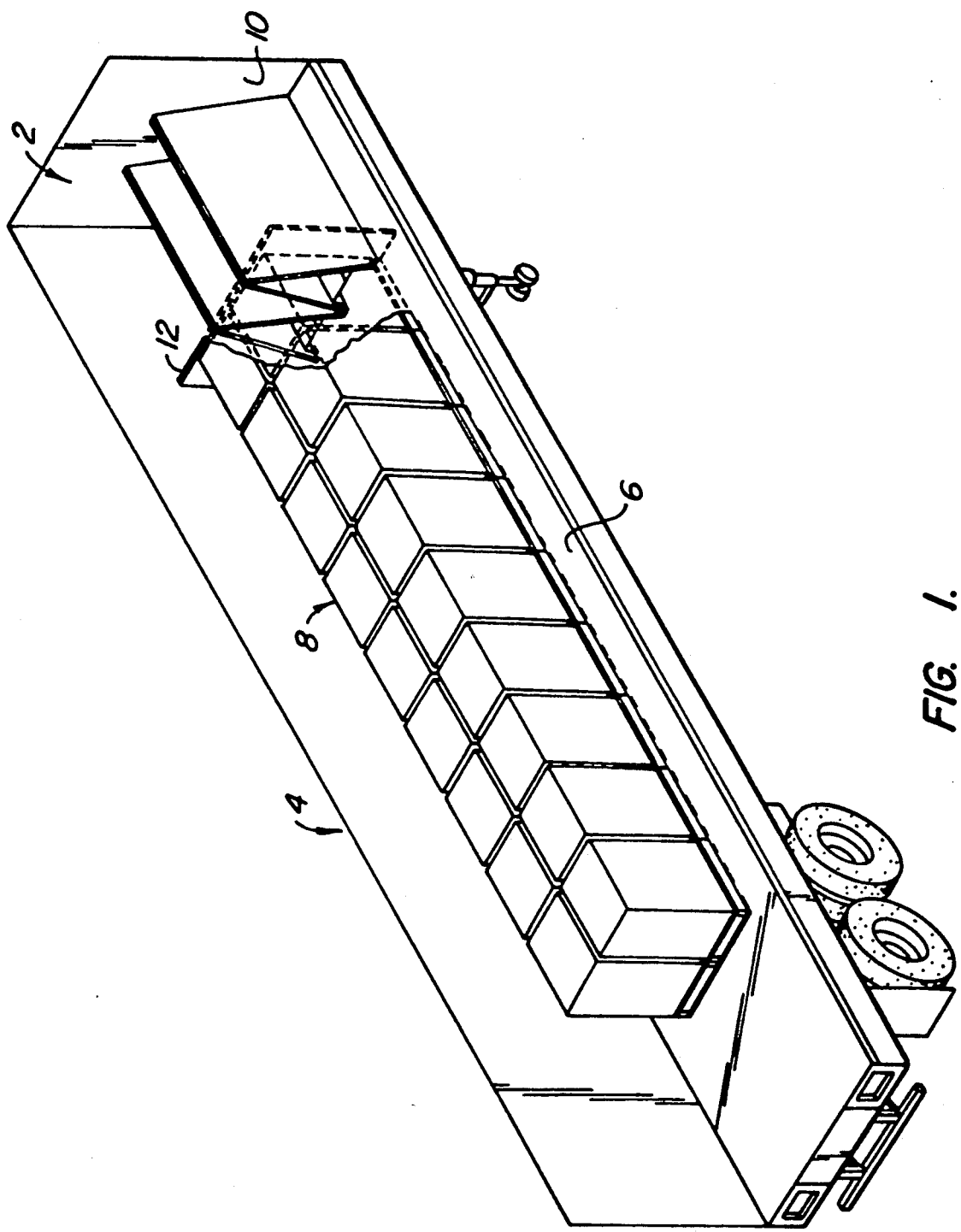
FIG. 1 is simplified overall view showing a truck trailer carrying a load, the load spaced apart from the forward bulkhead of the trailer by a void filler assembly.

A void filler assembly 2 is shown in FIG. 1 mounted within a trailer 4. Trailer 4 includes a bed 6 on which a load 8 rests. Assembly 2 is mounted between load 8 and the front end or bulkhead 10 of trailer 4. A load distributing spacer sheet 12 is placed between load 8 and void filler assembly 2 to better distribute the load applied to assembly 2.

Turning now also to FIG. 2, void filler assembly 2 is shown to include first and second void fillers 14, 16. Each void filler 14, 16 has a generally inverted V-shape. Void fillers 14, 16 are substantially identical so that only void filler 14 will be described in detail.

Void filler 14 includes first and second panels 18, 20. Each panel 18, 20 includes an outer face sheet 22 and an inner face sheet 24. Each panel 18, 20 also includes a core 26 sandwiched between and bonded to outer and inner face sheets 22, 24. As thus far described, panels 18, 20 are generally conventional in construction with core 26 being an expanded honeycomb core made of paper or corrugated board and outer and inner face sheets being made of corrugated board.

Each panel 18, 20 includes generally horizontal upper and lower edges 30, 32 and generally vertical first and second edges 34, 36. Edges 34, 36 are reinforced with multiple layers of reinforcing material 38, typically made of corrugated board. In some circumstances additional strength is required for void filler assemblies than is achieved with cellular core 26 and face sheets 22, 24. One way to do so is through the use of one or more braces formed as part of core 26. In the embodiment of FIG. 2, a single wooden brace 40 is shown. The use, number and positioning of such braces will depend upon the particular circumstances.

Upper edges 30 of first and second panels 18, 20 are secured to one another through a hinge 44. In the embodiment of FIG. 2, hinge 44 is created by forming inner face sheets 24 from a single sheet of material folded at a fold line 46 as illustrated in FIG. 3. The distance which lower edges can separate is limited by a limiter 50. Limiter 50 is made of a sheet of material, such as corrugated board, having a fold line 52 formed along its center and having outer edges 54 secured to inner face sheets 24 along lower edges 32 of panels 18, 20. Limiter 50 limits the movement of panels 18, 20 as void filler 14 moves from a collapsed or storage condition, in which inner sheets 24 are adjacent one another (see FIG. 5), to the extended or use condition of FIG. 2. The maximum distance 56 between lower edges 32 is thus determined by limiter 50.

First void filler 14 may be used alone or in conjunction with second void filler 16. When first and second void fillers 14, 16 are used as void filler assembly 2, it is preferred that they be connected at their adjacent lower edges 32 by a hinge 60. As with hinge 44, hinge 60 is created by making outer face sheet 22 of first panel 18 of second void filler 16 and outer face sheet 22 of second panel 20 of first void filler 14 from one sheet with a fold between lower edges 32.

The embodiment of FIGS. 1-3 is very efficient in its use of material. However, creating hinges 44, 60 in the manner described requires the use of double size face sheets. One way to eliminate this is through the use of a separate hinge element 64 as shown in FIG. 4. Hinge element 64 is secured to inner face sheets 24a of first and second panels 18a, 20a, typically through the use of a suitable adhesive. A similar hinge element could be used instead of hinge 60 to couple two or more void fillers to one another as well.

As illustrated in FIG. 5, void filler assembly 2 is made by stacking an outer face sheet 22, a core 26, a double sided, folded over sheet constituting inner face sheets 24, another core 26, another double-sized folded over sheet constituting outer face sheets 22, etc. until the desired number of panels 14, 16 are created. Limiters 50 are preferably prebonded to the folded over inner face sheets 24. Alternatively, limiters may be inserted between the folded over sheets constituting inner face sheets 24. Conventional bonding techniques are used to secure the appropriate areas elements to one another, typically accompanied by the application of heat and pressure, suggested by arrows 65. After assembly of its components, void filler assembly 2 is shown in FIG. 5 in its storage condition.

Figure 6:
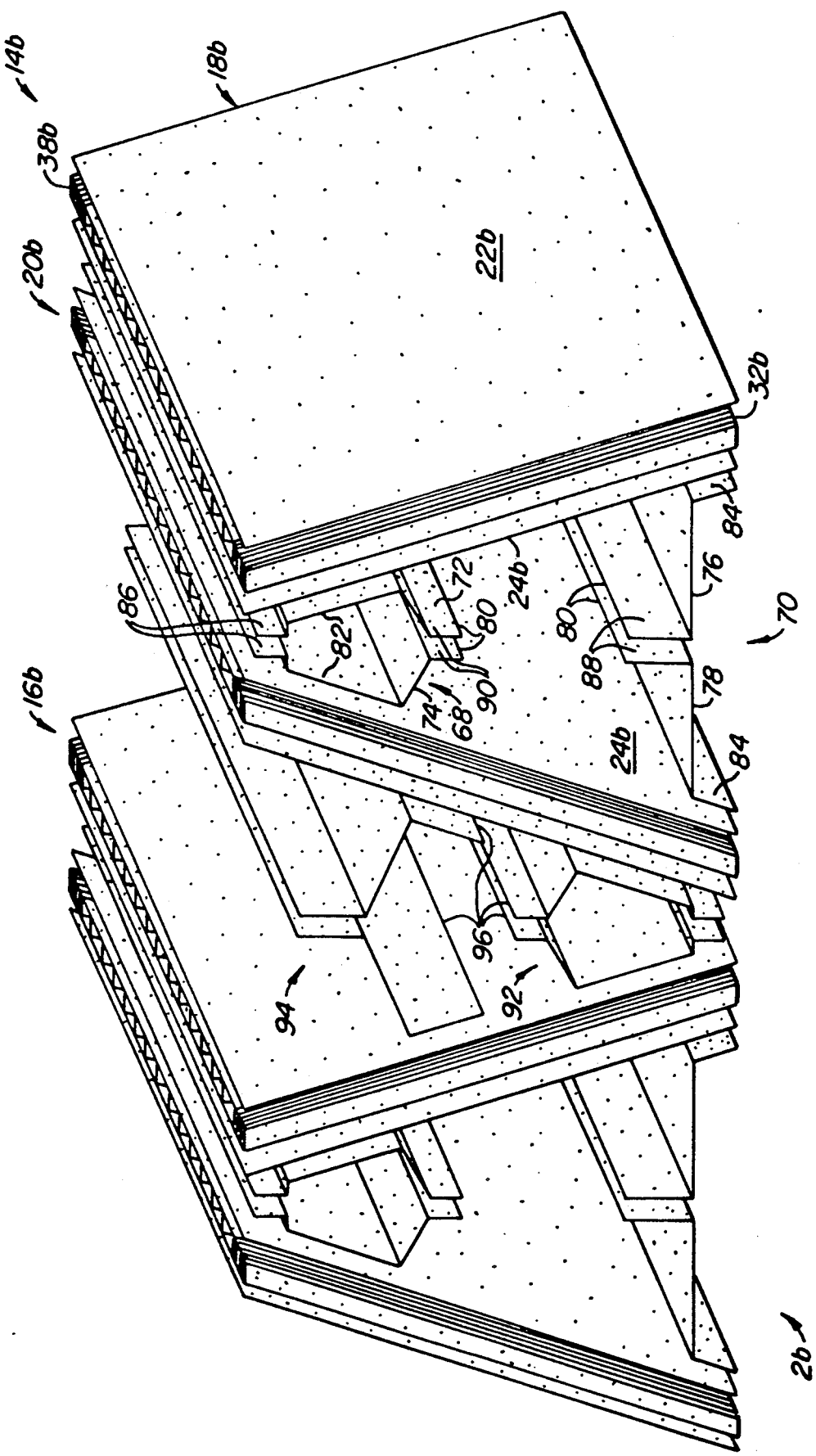
FIG. 6 is an exploded, simplified overall view showing the construction of an alternative embodiment of the void filler assembly of FIG. 2.

At FIG. 6 an alternative embodiment of void filler 2 is shown. Void filler assembly 2b is similar to void filler assembly 2 with corresponding reference numerals referring to corresponding elements so that the description of like elements will not be repeated. The main distinction between void filler assembly 2 and void filler assembly 2b is in use of hinge element 68 and limiter 70. Hinge element 68 includes first and second hinge portions 72, 74 while limiter 70 includes first and second limiter portions 76, 78. First hinge and limiter portions 72, 76 are formed from a single sheet of material having substantially the same dimensions as inner face 24b for ease of assembly. Such sheet is cut or substantially weakened separated along a separation line 80. First and second hinge portions 72, 74 are secured to their respective inner face sheets 24b of first and second panels 18b, 20b at first regions 82; first and second limiter portions 76, 78 are secured to inner face sheets 24b at second regions 84. First and second hinge portions 72, 74 are secured to one another along third regions 86 while first and second limiter portions 76, 78 are secured to one another along their fourth regions 88. To provide additional support, first and second hinge portions 72, 74 are also secured to one another along fifth regions 90. Although the embodiment of FIG. 5 uses more material than the embodiments of FIGS. 2 or 4, it has the advantage that hinge element 68 and limiter 70 are both formed from two sheets sized the same as inner face sheets 24b for ease of manufacture.

A similar hinge element 92 and limiter 94 are used to secure first void filler 14b to second void filler 16b. As is evident from the configuration and position of limiter 94, the position of limiter 70, as well as limiter 50, need not be at outer edges 32, 32b but may be spaced apart from such edges.

The making of void filler assembly 2b is similar to making void filler assembly 2 with the following differences. Between two separate inner face sheets 24b are placed two sheets which create element 68 and limiter 70. Each of these sheets is perforated or otherwise weakened along separation line 80 and has an appropriate adhesive applied to the appropriate region 82-90. After these elements are bonded together and the panels are moved from their storage configuration, to their use configuration, first and second hinge portions 72-74 separate from first and second limiter portions 76, 78, respectively, along lines 80. Similarly, hinge element 92 and limiter 94 coupling first and second void fillers 14b, 16b separate along lines 96 which have also been pre-weakened, such as through perforation.

Modification and variation can be made to the preferred embodiments without departing from the subject of the invention as defined in the following claims. For example, although it is preferred that a limiter be used for each void filler, a single limiter secured only to the lower edge 32 of first panel 18 of first void filler 14 and to lower edge 32 of second panel 20 of second void filler 16 could be used in some circumstances. Although the application has been described with reference one or two void fillers, three or more void fillers may be used as a void filler assembly as well.

What is claimed is:

1. A cargo container void filler having edge-on rigidity and strength comprising:
   first and second rigid panels, each panel having a core sandwiched between face sheets, each panel having generally horizontally extending upper and lower edges and having generally vertically extending first and second edges;
   a hinge pivotally coupling the upper edges of the first and second panels; and
   means, coupling the first and second panels, for limiting pivotal movement of the first and second panels from a storage configuration, with the first and second panels generally adjacent one another, to a use configuration, with lower edges spaced apart from one another by up to a maximum distance with the void filler assuming a generally inverted V-shape in the use condition.

2. The void filler of claim 1 wherein said core includes a cellular core material.

3. The void filler of claim 2 wherein the cellular core material is a honeycomb core material having open ends facing the face sheets.

4. The void filler of claim 1 wherein the first and second edges are reinforced.

5. The void filler of claim 4 wherein the reinforced first and second edges include layers of material.

6. The void filler of claim 1 wherein the core includes a generally horizontal brace.

7. The void filler of claim 6 wherein the brace is made of wood.

8. The void filler of claim 1 wherein the hinge includes a hinge element secured to the face sheets of the first and second panels.

9. The void filler of claim 1 wherein the opposed face sheets of the first and second panels are made of a single sheet including a folded region therebetween, said folded region constituting said hinge.

10. The void filler of claim 1 wherein the limiting means includes a folded limiter sheet having outer edges secured to the first and second panels and a generally horizontal fold line positioned centrally between the outer edges.

11. The void filler of claim 10 wherein the limiter sheet is secured adjacent the lower edges of the first and second panels.

12. The void filler of claim 1 further including third and fourth rigid panels, a hinge pivotally coupling said third and fourth panels, means for limiting pivotal movement of said third and fourth panels relative to one another such that said third and fourth panels form a V-shaped configuration when pivoted to the extent permitted by said means for limiting pivotal movement of said third and fourth panels, and a hinge pivotally coupling said second panel to said third panel, whereby said panels form a generally M-shaped configuration when said first and second panels and third and fourth panels are pivotally unfolded to the extent permitted by their respective limiting means.

13. The void filler of claim 12 further including means for limiting the pivotal movement of said second panel relative to said third panel such that said second and third panels form a V-shaped configuration when pivoted to the extent permitted by said means for limiting pivotal movement of said second and third panels.

14. A cargo container void filler having edge-on rigidity and strength comprising:
 first and second rigid panels, each panel including an inner and outer sheet and a core disposed between said sheets, each panel further including an upper, lower, first and second edge;
 a hinge pivotally coupling said upper edges of said panels;
 means for limiting pivotal movement of said first panel relative to said second panel to maintain said lower edges laterally spaced when pivotally unfolded to the extent permitted by said limiting means during use such that said panels form a V-shaped configuration; and
 means for reinforcing at least one of said front and rear edges on each panel to protect the void filler from loads applied against one of said front and rear edges when the void filler is positioned adjacent to cargo during use to prevent cargo from shifting during transit.

15. The void filler of claim 14 wherein said reinforcing means comprises multiple layers of material.

16. The void filler of claim 14 wherein said reinforcing means comprises corrugated board.

17. The void filler of claim 14 wherein each panel further includes a bracing member embedded in its core and oriented to extend between respective first and second edges.

18. The void filler of claim 14 further including third and fourth rigid panels, a hinge pivotally coupling said third and fourth panels, means for limiting movement of said third and fourth panels relative to one another such that said third and fourth panels form a V-shaped configuration when pivoted to the extent permitted by said means for limiting movement of said third and fourth panels, and a hinge pivotally coupling one of said first and second panels to one of said third and fourth panels, whereby said panels form a generally M-shaped configuration when said first and second panels and third and fourth panels are unfolded to the extent permitted by their respective limiting means.

19. The void filler of claim 18 further including means for limiting the pivotal movement of said second panel relative to said third panel such that said second and third panels form a V-shaped configuration when pivoted to the extent permitted by said means for limiting pivotal movement of said second and third panels.

20. A cargo container having a bed, cargo positioned on said bed, and a bulkhead, wherein the improvement comprising:
 a void filler having edge-on rigidity and strength having first and second rigid panels, each panel including an inner and outer sheet and a core disposed between said sheets, each panel further having an upper, lower, first and second edge, the void filler further including a hinge pivotally coupling the upper edges of the panels and means for limiting movement of the panels relative to one another such that said panels form a V-shaped configuration when pivoted to the extent permitted by said limiting means during use; and
 said void filler being positioned between the cargo and the bulkhead with the first edges facing the cargo and the second edges facing the bulkhead to prevent shifting of the cargo during transit.

21. The container of claim 20 wherein said first and second edges are reinforced.

22. The container of claim 20 further including third and fourth rigid panels, a hinge pivotally coupling said third and fourth panels, means for limiting movement of said third and fourth panels relative to one another, and a hinge pivotally coupling one of said first and second panels to one of said third and fourth panels, whereby said panels form a generally M-shaped configuration when unfolded for use.

* * * * *